(12) United States Patent
Graupner (10) Patent No.: US 8,255,407 B1
(45) Date of Patent: Aug. 28, 2012

(54) MATCHING OF DATA CENTER RESOURCE CAPABILITIES AND RESOURCE NEEDS BY MATCH-OVERLAPPING

(75) Inventor: Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2239 days.

(21) Appl. No.: 10/294,221

(22) Filed: Nov. 14, 2002

(51) Int. Cl.
*G06F 7/00* (2006.01)
*G06F 17/30* (2006.01)
*G06F 9/46* (2006.01)
*G06F 15/173* (2006.01)

(52) U.S. Cl. ............. 707/758; 707/999.003; 718/105; 709/226

(58) Field of Classification Search ............ 709/222, 709/200, 225, 226, 223; 707/3, 999.003, 707/999.001, 758, 705; 705/14; 718/105, 718/102, 101, 100
See application file for complete search history.

(56) References Cited

U.S. PATENT DOCUMENTS

| | | | |
|---|---|---|---|
| 5,978,829 A * | 11/1999 | Chung et al. | 718/102 |
| 6,345,297 B1 * | 2/2002 | Grimm et al. | 709/227 |
| 6,574,655 B1 * | 6/2003 | Libert et al. | 709/200 |
| 6,917,976 B1 * | 7/2005 | Slaughter et al. | 709/226 |
| 7,200,589 B1 * | 4/2007 | Graupner | 1/1 |
| 7,349,965 B1 * | 3/2008 | Graupner et al. | 709/226 |
| 2002/0120506 A1 * | 8/2002 | Hagen | 705/14 |
| 2003/0065774 A1 * | 4/2003 | Steiner et al. | 709/225 |
| 2003/0069974 A1 * | 4/2003 | Lu et al. | 709/226 |

OTHER PUBLICATIONS

Graupner, Sven, et al., "A Framework for Analyzing and Organizing Complex Systems" Feb. 2001, Hewlett-Packard Company.*
Raman, Rajesh et al., "Matchmaking: Distributed Resource Management for High Throughput Computing" Aug. 1998, Univeristy of Wisconsin, p. 1-7.*
Raman, Rajesh et al., "Matchmaking: an extensible framework for distributed resource manamgnet" 1999, Baltzer Science Publishers, p. 129-138.*
Grimshaw, Andrew S. et al., "Legion—A View from 50,000 feet" 1996, IEEE, p. 89-99.*
Czajkowski, Karl, et al., "A Resource Management Architecture for Metacomputing Systems" undated, University of Southern California, p. 1-19.*
Sep. 6, 2000, UDDI: http://www.uddi.org.
Global GRID Forum, http://www.gridforum.org/.
HP Utility Data Center (UDC), http://www.hp.com/go/hpudc, Nov. 2001.
UDC Architecture.

(Continued)

*Primary Examiner* — Brent Stace (57) ABSTRACT

Method and apparatus for matching resource capabilities of data centers to resource needs of data centers. Capability data sets received from one or more of a plurality of data centers are stored by a capability-demand advertising and matching computing arrangement for a certain time. Each capability data set identifies a data center and indicates resources available at the identified data center. Query descriptors are also stored by the computing arrangement for a certain time. Each query descriptor identifies a data center and specifies resource needs of the identified data center. The query descriptors stored at the computing arrangement are applied to each newly received capability data set. To each data center identified in a stored query descriptor that is satisfied by a newly received capability descriptor, the newly received capability data set is provided to the data center identified by the stored query descriptor. Each newly received query descriptor is applied to each capability data set stored at the computing arrangement. Each capability data set that matches the newly received query descriptor is provided to the data center identified in the newly received query descriptor.

21 Claims, 3 Drawing Sheets

OTHER PUBLICATIONS

Web Services Description Language (WSDL), http://www.we.org/TR/wsdl.
Resource Description Framework (RDF), http://www.w3.org/RDF/.
OSI: *X.500 Directory Service*, 1988, 1993, 1997.
LDAP: Yeong, W., Howes, T., Kille, S.: *Light Weight Directory Access Protocol*, RFC 1777(v2), Mar. 1995, Wahl, M., Howes, T., Kille, S.: *Light Weight Directory Access Protocol* (v3), RFC 2251, Dec. 1997.
IBM: Wyckoff, P., McLaughry, S.W., Lehman, T.J., Ford, D.A.: *T-Spaces*, IBM Systems Journal, vol. 37, No. 3, http://www.research.ibm.com/journal/sj/373/wyckoff.html or http://www.almaden.ibm.com/cs/TSpaces/.
2002, Global GRID Forum http://www.gridforum.org/.
HP Utility Data Center (UDC), http://www.hp.com/go/hpudc, Nov. 2001. (printed from internet Feb. 18, 2004).
UDCArchitecture, (printed from the internet Feb. 19, 2004).
2002, Web Services Description Language (WSDL), http://www.we.org/TR/wsdl. (printed from internet Feb. 18, 2004).
2002, Resource Description Framework (RDF), http://www.w3.org/RDF/. (printed from internet Feb. 19, 2004).
OSI: *X.500 Directory Service*, 1988, 1993, 1997. (printed from internet Feb. 19, 2004).

* cited by examiner

MATCHING OF DATA CENTER RESOURCE CAPABILITIES AND RESOURCE NEEDS BY MATCH-OVERLAPPING

FIELD OF THE INVENTION

The present invention generally relates to grid computing arrangements, and more particularly to matching the resource capabilities and resource needs of data centers in a grid computing arrangement.

BACKGROUND

The grid computing model treats resources of computing systems in a manner analogous to the way in which a power grid supplies electricity. In the grid computing model, multiple data centers collectively provide resources to various users. The users are generally unaware of the identity of the particular data center providing a resource in much the same way that users of electricity are unaware of which power generators are currently contributing to the local power supply.

Situations may arise where users' demands on a data center exceed or are different from the capabilities of one data center. For example, a business user's data storage needs are likely to grow as the user's business grows. In this situation additional storage resources must be found to meet the user's needs. Rather than physically expand the resources of one data center to meet growing needs, other data centers are called upon to provide the necessary resources. A similar situation may arise in the services that are provided by data centers and the services needed by clients.

Current methods for matching resource demands with resource supplies in data centers are often managed by operators. Users of applications interact with human operators in order to request additional resources or release unneeded resources. Thus, it is left to operators to recognize and respond to changes in resource requirements and capabilities in data centers. Operators, however, in responding to resource requests may have difficulty finding optimal matches in large combinatorial allocation spaces. Furthermore, manually managing the resource allocations of data centers presents large operation costs and creates the risk of human-introduced errors. Errors in resource allocation may affect the availability of resources and entire data centers, and also result in lost revenue.

Further complicating the management of resources allocated between data centers is the exchange of information that describes the resources and requirements. Not only must steps be taken to initially establish relationships between data centers, but the exchange of information between data centers requires an agreed-upon format for the information—possibly leading to quadratic growth in information exchange formats. The manager of data center resource information must also devise a way to keep the information current so that decisions are not made based on dated and inaccurate information.

A system and method that address the aforementioned problems and automates the matching of resource demands with resource supplies, as well as other related problems, are therefore desirable.

SUMMARY OF THE INVENTION

The present inventions provides for matching of resource capabilities of data centers to resource needs of data centers. Capability data sets received from one or more of a plurality of data centers are stored by a computing arrangement. Each capability data set identifies a data center and indicates resources available at the identified data center. Query descriptors are also stored by the computing arrangement. Each query descriptor identifies a data center and specifies resource needs of the identified data center. The query descriptors stored at the computing arrangement are applied to each newly received capability data set. To each data center identified in a stored query descriptor that is satisfied by a newly received capability descriptor, the newly received capability data set is provided to the data center identified by the stored query descriptor. Each newly received query descriptor is applied to each capability data set stored at the computing arrangement. Each capability data set that matches the newly received query descriptor is provided to the data center identified in the newly received query descriptor.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, an arrangement is provided for advertising resource needs and resource capabilities of data centers. The invention supports establishing a federated inter-data-center control system by way of advertisements indicating needs for resources and capability advertisements indicating resource availability in the data centers. The matching of advertisements to inquiries is automated, which avoids the need to individually configure relationships amongst the data centers. Different embodiments of the invention can be built using existing infrastructure to support the advertising and inquiry processing.

In one embodiment, both advertisements indicating needs for resources ("inquiries") and capability advertisements are stored for matching against newly submitted advertisements. That is, a newly submitted capability advertisement is matched against the stored inquiries. If the newly submitted capability advertisement matches a stored inquiry, the newly submitted capability advertisement is provided to the data center responsible for the matching inquiry. By storing both inquiries and capability advertisements, advertisements may be quickly matched faster because when a new capability advertisement is submitted, a number of stored inquiries may already be present. Thus, the matching process need not wait for newly submitted inquiries to attempt a match. In addition, better matching results are possible because the set of candidate inquiries for matching to a capability advertisement is larger when the inquiries are stored. Storing inquiries removes the need to resubmit an inquiry when no matching capability advertisement is found. In addition, storing inquiries provides the option of retaining the inquiries for some period of time or until a desirable matching capability advertisement is submitted. Thus, a data center may be apprised of a data center having matching capabilities, and work with those capabilities until a better match is found.

Figure 1:
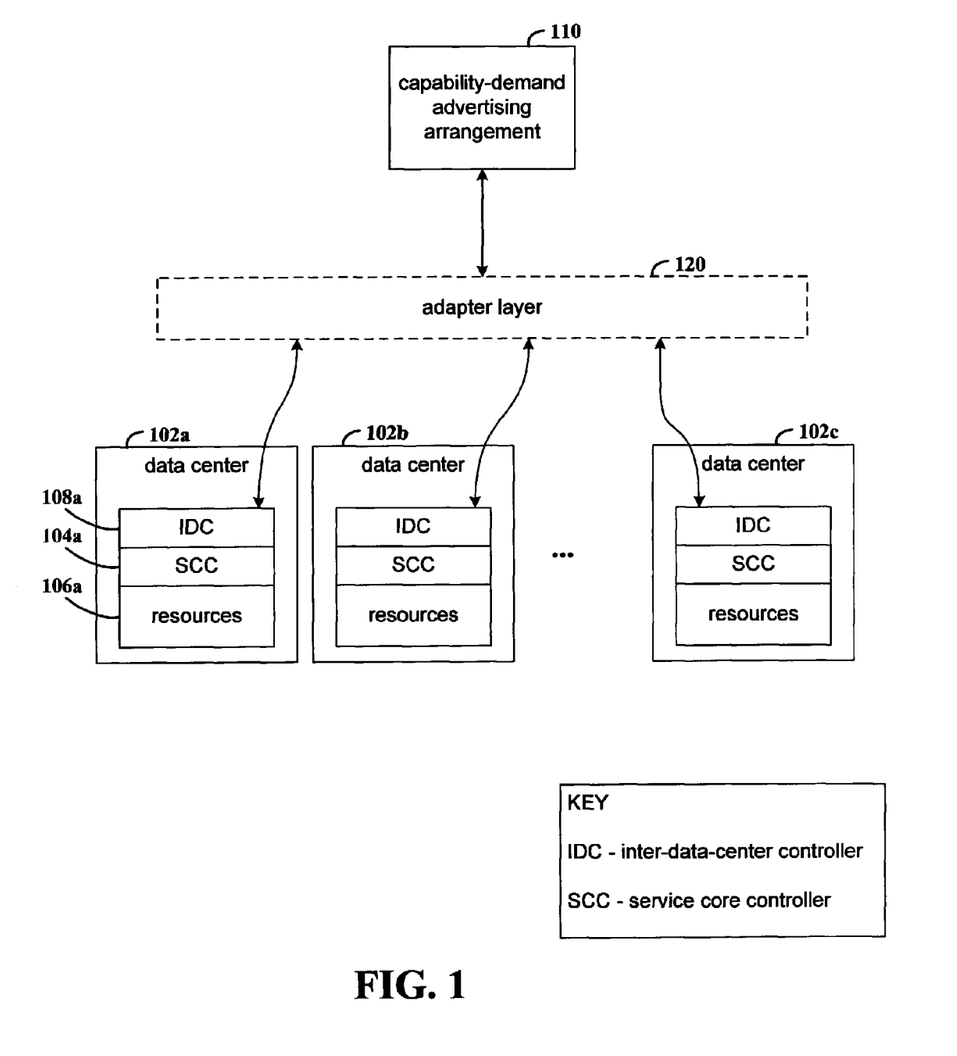
FIG. 1 is a functional block diagram of an example grid data center computing arrangement in accordance with one embodiment of the invention.

FIG. 1 is a functional block diagram of an example grid computing data center arrangement in accordance with one embodiment of the invention. The example arrangement includes multiple data centers 102a-102c. Each data center provides computing resources ranging from, for example, application-specific software services to hardware resources such as storage arrays. In an example embodiment, controller software in each data center provides tools for planning, designing, and managing resources of the data center. An example data center also includes a management hardware/software subsystem that determines and saves the topology of and resources in the data center. Example resources in the data center include servers, storage arrays, a network operations center/portal/integrated service subsystem, and various service applications. Resources may even be extended into software services a data center may offer.

Each data center includes a service core controller (SCC) that is responsible for managing the resources within the data center. For example, data center 102a includes SCC 104a, which manages the resources 106a. An inter-data-center controller (IDC) in each data center extends the functions of the SCC to include reallocating resources between data centers, rerouting and distributing load between data centers, and re-balancing service allocation arrangements between data centers in response to fluctuations in demand. IDC 108a is the inter-data-center controller for data center 102a. The IDCs are intercoupled via a network (not shown).

The IDCs in each of the data centers are coupled to a capability-demand advertising arrangement 110. In an example embodiment, the advertising arrangement registers descriptions of the capabilities ("capability descriptors") of the data centers and also registers inquiries ("query descriptors") from data centers, both submitted by the IDC components. The capability descriptors and query descriptors are registered for a certain period of time ("lease period"), which helps to keep the advertised resource capabilities and needs current relative to the actual resource capabilities and needs at the data centers. In addition, if a data center is temporarily unavailable and the lease expires, the data center can submit a new capability descriptor when the data center is available, which allows the data center to rejoin the federation. Each data center may withdraw an advertisement before the corresponding lease expires, or renew the lease for certain period of time.

Various infrastructures are available for implementing the capability-demand advertising arrangement. The infrastructure selected for a particular implementation will depend on design requirements. Example infrastructures include: well-known portals, bulletin boards or web sites that manage advertisements; universal description and discovery infrastructures comprised of a multitude of registry servers; enterprise directories, for example, UDDI registries, X.500-based directories or LDAP directories; public or enterprise-wide search engines; and T-Spaces or Java-Spaces. With each infrastructure, the access point is known to each IDC.

In another embodiment, an adapter layer 120 translates advertising information, for example, the capability descriptors and query descriptors, to a format that is compatible with the advertising arrangement 110. The adapter layer hides specifics of the underlying implementation of the advertising arrangement from the IDC components and provides a generalized abstraction of how the capability descriptors and query descriptors can be described independent of the underlying implementation. This allows each data center to advertise and query for capabilities in a way that is independent of the manner used by the other data centers. Thus, the adapter layer eliminates the need for a priori agreements. The adapter layer is implemented at the level required by implementation requirements. For example, the adapter layer may be implemented at each data center within either the IDC or SCC components, or centrally within the topology.

Figure 2:
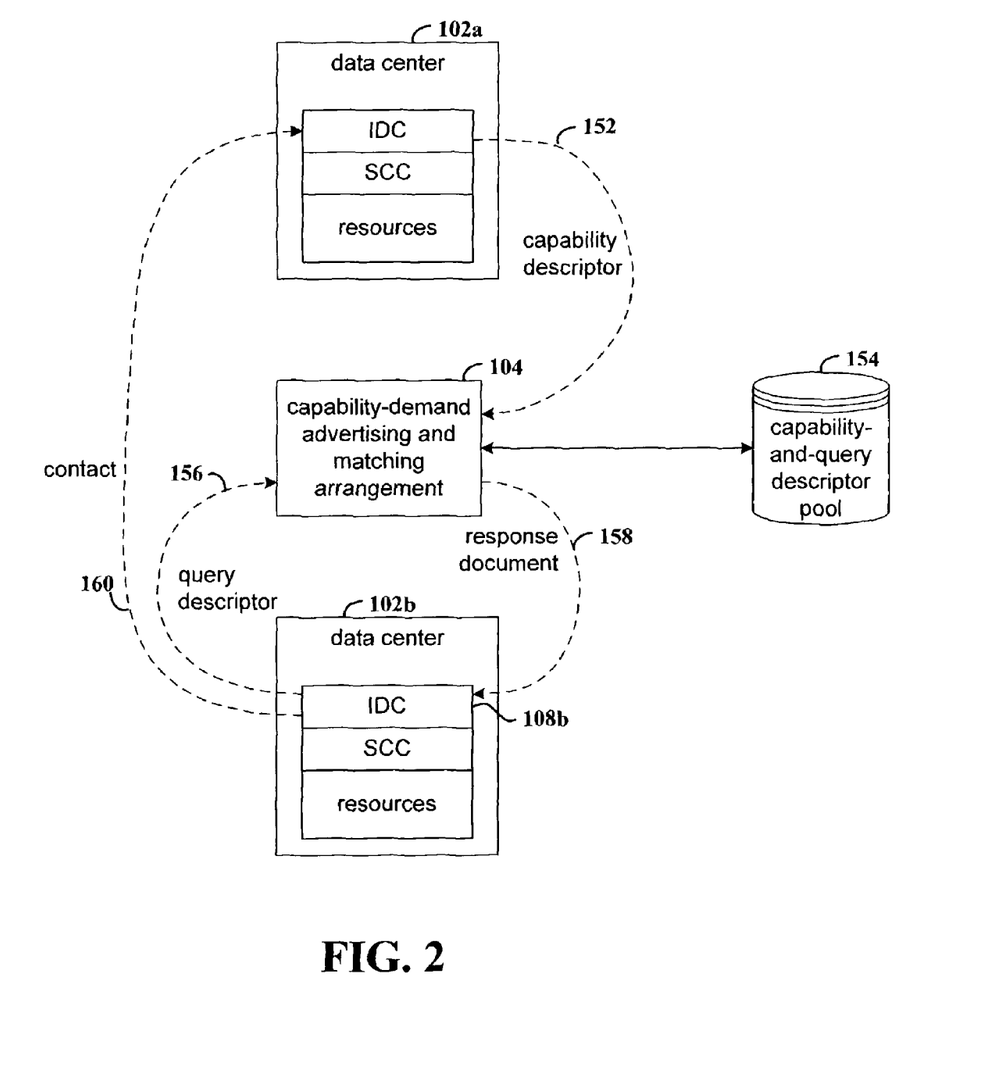
FIG. 2 illustrates an example data flow in advertising and querying the resource capabilities of a data center and establishing contact between an offering and inquiring data center.

FIG. 2 illustrates an example data flow in advertising the resource capabilities of a data center. The description of the data flow begins with the IDC of data center 102a transmitting a capability descriptor (line 152) to the capacity-demand advertising arrangement 104. The capability descriptor describes the capabilities of data center 102a. Upon receiving a capability descriptor, the advertising arrangement adds the capability descriptor to a pool 154 of capability descriptors and query descriptors. Data center 102b submits a query descriptor (line 156) to the advertising arrangement when a need arises to determine whether any of the data centers participating with the advertising arrangement have a desired capability. The query descriptor includes a list of elements and associated attributes that may be present in a capability descriptor. The advertising arrangement stores both capability descriptors and query descriptors. Even though a single capability-and-query descriptor pool 154 is illustrated, it will be appreciated that separate pools could be established for the capability descriptors and query descriptors, depending on implementation requirements.

When a capability descriptor arrives, the stored query descriptors are applied to the new capability descriptor to determine whether the capability descriptor satisfies the terms of the query descriptors. For those query descriptors that are satisfied, the advertising arrangement returns the capability descriptor to the data center(s) identified in satisfied query(s) (line 158). When a new query descriptor arrives at the advertising arrangement, the pool of capability descriptors is searched for those having attributes that match the attributes in the query descriptor. A response document, containing the capability descriptors that satisfy the query, is returned (line 158) to the data center 102b that submitted the query. Data center 102b uses the information in the response document to identify a data center having the capabilities that best meets its resource needs. The IDC component 108b of data center 102b initiates contact (line 160) with the data center 102a that best meets the resource needs.

The following paragraphs describe an example implementation of a capability descriptor, a query descriptor, and a results document. A capability descriptor is a structured attribute-value list with mandatory attributes and optional attributes. In the presented example, XML syntax is used. The attribute-value list is structured in that the values may be literal values or further attribute-value lists such that the overall structure forms a tree (recursive list of lists). The attributes include a name, an identifier, a data center location description, an access reference to the data center (for example, a URL), a lease period, and an access code (for example, a key to establish secure communication). Depending on the particular data center, additional attributes include descriptions of the capabilities of the data center such as the machines that are available for use, preconfigured software, operational policies, constraints and other characteristics.

The following code segment illustrates an example capability descriptor (CD).

```
<CD name="PaloAltoDC" id="PACAUS">
    <location>                              <!-- mandatory section -->
      Palo Alto, 1501 Page Mill Rd., California, USA
    </location>
    <accessor url="http://sos.hpl.hp.com:8081/ma439" />
    <lease expires="03/25/2002, 12:00" autorenewal="false" />
    <accesscode>
      mQCNAi9cjI0AAAEEALyqJI0YFI+HHpCqgovzSSWd7gIJ/
      tCBtHfGZn01EQ//PXT5
    </accesscode>
    <!-- ---------------------------------- -->   <!-- optional section -->
    <resources>
      <server>
        <server class="lpr2000" num="256" />
        <server class="lpr2000" num="64" />
      </server>
      <storage>
        <storage class="XP512" num="4">
          <capacity>250</capacity>
        </storage>
      </storage>
      <service>
        <service class="DCfarm">
        <farm name="EmployeePortalFarm" ref="http://..." />
      </service>
    </resources>
</CD>
```

A query descriptor (QD) contains a list of elements with attributes that may occur in the registered capability descriptor. The list may be related to mandatory or optional elements of the capability descriptor. The example query descriptor set forth in the code below represents a query that specifies a capability descriptor that advertises "16 lpr2000" machines with a 100 giga-byte storage block located in Palo Alto. Wildcard characters such as "*" and "?", as well as regular expressions, can be used for matches.

```
<QD>
    <location>*Palo*Alto*</location>        <!-- query attributes in
                                                 mandatory fields -->
    <!-- ---------------------------------- -->
    <server class="lpr2000" num="16" />>    <!-- query attributes in
                                                 optional fields -->
    <storage class="*" capacity="100" />
</QD>
```

In an alternative embodiment, standard XML techniques for extracting information from capability descriptor documents can be used to formulate queries. The presence of specified information is interpreted as a match. Example XML techniques for describing and extracting selected information from XML documents include, for example, XPath or XQuery.

The response document includes a list of capability descriptors having attributes that match the attributes specified in the query descriptor. The code below illustrates an example response document (RD).

Figure 3:
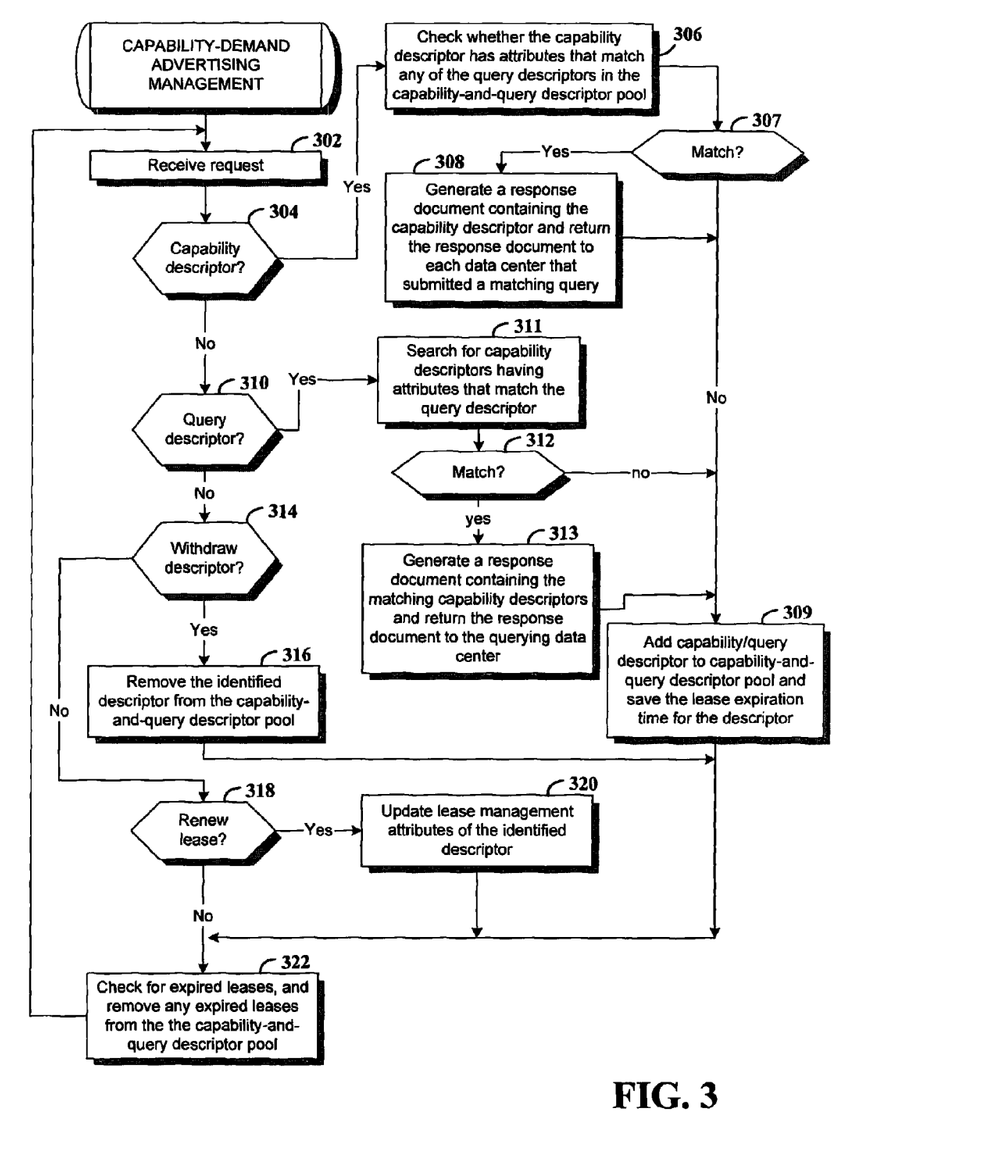
FIG. 3 is a flowchart of an example process for managing capability and demand advertising in accordance with an example embodiment of the invention.

```
<RD>
    <CD name="PaloAltoUDC" id="PACAUS">     <!-- first matching CD,
                                                 e.g. the one from -->
    ...                                     <!-- Figure 3 -->
    </CD>
    <CD ...> ...                            <!-- second matching
                                                 CD -->
    </CD>
    ...
</RD>
```

FIG. 3 is a flowchart of an example process for managing resource capability and resource demand advertising in accordance with an example embodiment of the invention. When the advertising arrangement receives a request from a data center (step 302), the type of request dictates the action taken. If the request is a capability descriptor (decision step 304), the stored query descriptors are applied to the new capability descriptor (step 306). If the capability descriptor satisfies any of the stored query descriptors (decision step 307), a response document is generated to contain the capability descriptor matching a stored query. All or a limiting subset of matching query descriptors are assembled in a response document. The response document is then transmitted to each data center identified in a query descriptor satisfied by the capability descriptor (step 308). In the case that no matching query descriptor could be found among the stored query descriptors, the capability descriptor is added to the pool of stored capability descriptors, and a timestamp ("lease expiration time") is saved in association with the capability descriptor (step 309).

If the request is a query descriptor (decision step 310), the pool of stored capability descriptors is searched for capability descriptors having attributes that match the attributes in the query descriptor (step 311). If any of the capability descriptors satisfy the query descriptor (decision step 312), a response document with the matching capability descriptors is generated and returned to the inter-data-center controller that submitted the query (step 313). In the case that no matching capability descriptor could be found among the stored capability descriptors, the query descriptor is added to the pool of capability descriptors, and a timestamp ("lease expiration time") is saved in association with the descriptor (step 309). In one embodiment, the capability descriptors and query descriptors are given lease expiration times having the same duration. In other embodiments, the durations of the leases may be different between capability descriptors and query descriptors, or the durations of each descriptor may be individually tailored by data center.

If the request is for withdrawal of either a capability descriptor or a query descriptor (decision step 314), the identified capability/query descriptor is removed from the pool (step 316). If the request is to renew (or extend) a lease for a capability/query descriptor (decision step 318), the lease-management attributes, for example, the lease expiration time, of the capability/query descriptor are updated (step 320).

Periodically, the advertising arrangement checks for capability descriptors and query descriptors having expired leases (step 322). When the lease expires, the capability/query descriptor is removed from the pool. It will be appreciated that even though the example process shows that leases are checked after processing each request, the check could alternatively be part of a separate process or performed before each request is processed.

The present invention is believed to be applicable to a variety of systems for exchanging information describing the capabilities of data centers and has been found to be particularly applicable and beneficial in grid computing arrangements. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of matching resource capabilities of data centers to resource needs of data centers, comprising:
    storing at a computing arrangement capability data sets received from a plurality of data centers, wherein each capability data set includes a subset that has mandatory information and a subset that has optional information, wherein the mandatory information identifies a data center and the optional information indicates resources available at the identified data center, and at least one of the capability data sets specifies respective server classes of a plurality of available servers;
    storing at the computing arrangement query descriptors received from one or more of the plurality of data centers, wherein each query descriptor specifies information to be matched to at least one of the mandatory information and the optional information of the plurality of capability data sets, and at least one of the query descriptors specifies a server class;
    storing each query descriptor at the computing arrangement for up to a selected maximum period of time that defines a query-lease period;
    applying each query descriptor stored at the computing arrangement to each newly received capability data set;
    to each data center identified in a query descriptor satisfied by the newly received capability descriptor, providing the newly received capability data set;
    identifying at each data center identified in a query descriptor satisfied by the newly received capability descriptor the data center that better matches the resource needs of the data center identified in a query descriptor satisfied by the newly received capability descriptor;
    applying each newly received query descriptor to each capability data set stored at the computing arrangement, and providing each capability data set that matches the newly received query descriptor to the data center identified in the newly received query descriptor; and
    identifying at the data center identified in the newly received query descriptor the data center that better matches the resource needs of the data center identified in the newly received query descriptor,
    wherein a data center that has provided a query descriptor works with a data center having matching resources until the data center that better matches the resource needs is found.

2. The method of claim 1, further comprising storing each capability data set at the computing arrangement for up to a selected maximum period of time that defines a capability-lease period.

3. The method of claim 2, further comprising removing a capability data set from storage at the computing arrangement before expiration of an associated capability-lease period in response to a request from the data center identified by the capability data set.

4. The method of claim 3, further comprising removing a query descriptor from storage at the computing arrangement before expiration of an associated query-lease period in response to a request from the data center identified by the query descriptor.

5. The method of claim 2, further comprising extending the query-lease period of a query descriptor in response to a request from the data center identified by the query descriptor.

6. The method of claim 2, further comprising extending the capability-lease period of a capability data set in response to a request from the data center identified by the capability data set.

7. The method of claim 1, further comprising converting each capability data set from a first format to a second format prior to storage at the computing arrangement.

8. The method of claim 7, further comprising converting each query descriptor from a third format to a fourth format compatible with the computing arrangement.

9. The method of claim 1, wherein:
    at least one capability data set includes data that describe one or more types of storage and one or more quantities of storage;
    at least one capability data set includes data that describe one or more service descriptions; and
    at least one query descriptor includes data that describe at least one of the one or more types of storage, a quantity of storage, and the one or more service descriptions.

10. The method of claim 9, wherein one or more of the at least one query descriptor further includes one or more logic operators that form a logical expression in combination with the one or more of the types of servers, the types of storage, a quantity of storage, and the service descriptions.

11. A computing system, comprising:
    a network;
    a plurality of data centers coupled to the network, each data center having a respective set of resources and configured with a resource controller, each resource controller configured to generate, if resources are available, a capability data set that includes a subset that has mandatory information and a subset that has optional information, wherein the mandatory information identifies a data center and the optional information indicates the resources available at the data center for use by another data center, the resource controller further configured to generate, if resources are needed, a query descriptor that specifics information to be matched to at least one of the mandatory information and the optional information of the plurality of capability data sets and at least one of the capability data sets specifies respective server classes of a plurality of available servers, and at least one of the query descriptors specifies a server class; and
    an advertising computing arrangement coupled to the data centers, the advertising computing arrangement configured to,
    store the capability data sets and query descriptors received from the data centers,
    store each query descriptor at the advertising computing arrangement for up to a selected maximum period of time that defines a query-lease period,
    apply each query descriptor stored at the advertising computing arrangement to each newly received capability data set,
    provide to each data center identified in a query descriptor satisfied by the newly received capability descriptor, the newly received capability data set,
    apply each newly received query descriptor to each capability data set stored at the advertising computing arrangement, and
    provide each capability data set that matches the newly received query descriptor to the data center identified in the newly received query descriptor,
    wherein each data center of the plurality of data centers is configured to,
    identify at each data center identified in a query descriptor satisfied by the newly received capability descriptor the data center that better matches the resource needs of the data center identified in a query descriptor satisfied by the newly received capability descriptor; and identify at the data center identified in the newly received query descriptor the data center that better matches the resource needs of the data center identified in the newly received query descriptor;

wherein a data center that has provided a query descriptor works with a data center having matching resources until the data center that better matches the resource needs is found.

12. The system of claim 11, wherein the advertising computing arrangement is further configured to store each capability data set for up to a selected maximum period of time that defines a capability-lease period.

13. The system of claim 12, wherein the advertising computing arrangement is further configured to remove a query descriptor from storage before expiration of the query-lease period in response to a request from the identified data center.

14. The system of claim 12, wherein the advertising computing arrangement is further configured to remove a capability data set from storage before expiration of the capability-lease period in response to a request from the identified data center.

15. The system of claim 12, wherein the advertising computing arrangement is further configured to extend the query-lease period of a query descriptor in response to a request from the identified data center of the query descriptor.

16. The system of claim 12, wherein the advertising computing arrangement is further configured to extend the capability-lease period of a capability data set in response to a request from the identified data center of the capability data set.

17. The system of claim 11, further comprising a format converter coupled to the resource controllers and to the advertising computing arrangement, the format converter configured to convert each capability data set from a first format to a second format prior to storage by the advertising computing arrangement.

18. The system of claim 17, wherein the format converter is configured to convert each query descriptor from a third format to a fourth format prior to storage by the advertising computing arrangement.

19. The system of claim 11, wherein,
at least one capability data set includes data that describe, one or more types of storage and one or more quantities of storage;
at least one capability data set includes data that describe one or more service descriptions; and
at least one query descriptor includes data that describe at least one of the one or more types of storage, a quantity of storage, and the one or more service descriptions.

20. The system of claim 19, wherein one or more of the at least one query descriptor further includes one or more logic operators that form a logical expression in combination with the one or more of the types of servers, the types of storage, a quantity of storage, and the service descriptions.

translating each query descriptor to the format that is compatible with the computing arrangement prior to storing the query descriptors at the computing arrangement;
storing each query descriptor at the computing arrangement for up to a selected maximum period of time that defines a query-lease period;
receiving a new capability data set at the computing arrangement and in response to receiving the new capability data set storing the new capability data set and comparing each query descriptor stored at the computing arrangement to the new capability data set;
providing the new capability data set to each data center identified in a query descriptor satisfied by the new capability data set;
receiving a new query descriptor at the computing arrangement and in response to receiving the new query descriptor storing the new query descriptor and comparing the new query descriptor to each capability data set stored at the computing arrangement; and
providing each capability data set that matches the new query descriptor to the data center identified in the new query descriptor.

21. An article of manufacture, comprising:
a non-transitory computer readable medium configured with instructions for causing a computer to perform the steps of,
storing at a computing arrangement capability data sets received from a plurality of data centers, wherein each capability data set includes a subset that has mandatory information and a subset that has optional information, wherein the mandatory information identifies a data center and the optional information indicates resources available at the identified data center and at least one of the capability data sets specifies respective server classes of a plurality of available servers;
storing at the computing arrangement query descriptors received from one or more of the plurality of data centers, wherein each query descriptor specifies information to be matched to at least one of the mandatory information and the optional information of the plurality of capability data sets, and at least one of the query descriptors specifies a server class;
storing each query descriptor at the computing arrangement for up to a selected maximum period of time that defines a query-lease period;
applying each query descriptor stored at the computing arrangement to each newly received capability data set;
to each data center identified in a query descriptor satisfied by the newly received capability descriptor providing the newly received capability data set;
identifying at each data center identified in a query descriptor satisfied by the newly received capability descriptor the data center that better matches the resource needs of the data center identified in a query descriptor satisfied by the newly received capability descriptor;
applying each newly received query descriptor to each capability data set stored at the computing arrangement, and
providing each capability data set that matches the newly received query descriptor to the data center identified in the newly received query descriptor
identifying at the data center identified in the newly received query descriptor the data center that better matches the resource needs of the data center identified in the newly received query descriptor,
wherein a data center that has provided a query descriptor works with a data center having matching resources until the data center that better matches the resource needs is found.

* * * * *

UNITED STATES PATENT AND TRADEMARK OFFICE
CERTIFICATE OF CORRECTION

PATENT NO. : 8,255,407 B1  
APPLICATION NO. : 10/294221  
DATED : August 28, 2012  
INVENTOR(S) : Graupner Page 1 of 1

It is certified that error appears in the above-identified patent and that said Letters Patent is hereby corrected as shown below:

In the Claims

Column 7, line 35, in Claim 1, delete "arrangement," and insert -- arrangement; --, therefor.

Column 8, line 34, in Claim 11, delete "specifics" and insert -- specifies --, therefor.

Column 9, lines 56-62, Column 10, lines 1-14, Claim 20, after "descriptions." delete "translating each query descriptor to the format that is compatible with the computing arrangement prior to storing the query descriptors at the computing arrangement; storing each query descriptor at the computing arrangement for up to a selected maximum period of time that defines a query-lease period; receiving a new capability data set at the computing arrangement and in response to receiving the new capability data set storing the new capability data set and comparing each query descriptor stored at the computing arrangement to the new capability data set; providing the new capability data set to each data center identified in a query descriptor satisfied by the new capability data set; receiving a new query descriptor at the computing arrangement and in response to receiving the new query descriptor storing the new query descriptor and comparing the new query descriptor to each capability data set stored at the computing arrangement; and providing each capability data set that matches the new query descriptor to the data center identified in the new query descriptor.".

Signed and Sealed this  
Eighteenth Day of March, 2014

Michelle K. Lee  
*Deputy Director of the United States Patent and Trademark Office*